(12) United States Patent
Consens et al.

(10) Patent No.: US 6,275,822 B1
(45) Date of Patent: Aug. 14, 2001

(54) MAINTAINING VERY LARGE INDEXES SUPPORTING EFFICIENT RELATIONAL QUERYING

(75) Inventors: Mariano Paulo Consens; Timothy Snider, both of Waterloo (CA)

(73) Assignee: Joint Technology, Corporation, Ontario (CA)

(*) Notice: Subject to any disclaimer, the term of this patent is extended or adjusted under 35 U.S.C. 154(b) by 14 days.

(21) Appl. No.: 09/438,128

(22) Filed: Nov. 9, 1999

(51) Int. Cl.[7] ............................. G06F 17/30; G06F 7/00
(52) U.S. Cl. ........................................ 707/3; 707/1; 707/7
(58) Field of Search ............................................. 707/1–10

(56) References Cited

U.S. PATENT DOCUMENTS

| | | | |
|---|---|---|---|
| 4,644,471 | * | 2/1987 | Kojima et al. ........................... 707/3 |
| 5,239,663 | * | 8/1993 | Faudemay et al. ...................... 707/3 |
| 5,619,692 | * | 4/1997 | Malkemus et al. ...................... 707/2 |
| 5,926,807 | * | 7/1999 | Peltonen et al. ......................... 707/3 |

* cited by examiner

*Primary Examiner*—Bernarr E. Gregory
(74) *Attorney, Agent, or Firm*—Beyer Weaver & Thomas, LLP

(57) ABSTRACT

The merger of a small sort vector with a big sort vector by the use of low limit and high limit pointers which are initialized to point into the big sort vector for each entry in the small sort vector. The merge of the big and small sort vectors is carried out by successive refinement passes through the small sort vector to achieve the convergence of the low and high limit pointers. The convergence point for the pointers indicates the insertion point for each entry in the small sort vector in the big sort vector. The converged limit pointers are used to define the merged big and small sort vectors.

10 Claims, 10 Drawing Sheets

MAINTAINING VERY LARGE INDEXES SUPPORTING EFFICIENT RELATIONAL QUERYING

FIELD OF THE INVENTION

The present invention is directed to an improvement in relational database systems and in particular to the maintenance of very large indexes that support efficient relational queries on databases.

BACKGROUND OF THE INVENTION

In relational database systems, it is important to create indexes on columns of the tables in the database. It is well-known that the efficiency of relational operations such as the JOIN operation or the evaluation of query constraints (SELECTION) is improved if the relevant columns of the table across which the operation take place are indexed. From the point of view of speeding query processing, it is desirable to have available indexes for all columns (and combinations) of all tables in a relational database.

In relational database systems, it is important to be able to efficiently add new data to an existing database. The addition of data to the table space may involve not only the addition of data, but the maintenance of indexes. The indexes for the existing data will be merged with the indexes for the data to be added.

For very small collections of data a merger of relational data tables and indexes may not pose a significant problem. For large data sets, however, the merging of the new data with the existing data, and the merging of associated indexes into the resultant table may be constrained by system limitations. The internal machine memory may be too small to accommodate the data structures that are being merged, resulting in time-expensive swapping of data from larger but slower data storage devices (typically magnetic disks).

Relational database indexing schemes are developed to permit the rapid execution of relational operations on the relational data. The techniques for maintaining relational database indexes will depend on the structure of the indexes to be merged.

One type of data structure which is of use in indexing relational data is the sort vector data structure. In the co-pending application entitled "Indexing Databases For Efficient Relational Querying", naming Mariano Consens as inventor, and Joint Technology Corpomdon as assignee, a collection of data structures is described that indexes all the columns on all the tables of a database in a space and time efficient manner. The co-pending application describes the use of sort vector files, and associated join bit files in art index structure for relational databases. The use of sort vectors is not restricted to such applications, however, and issues relating to the merger of sort vector indexes have a wider application.

Because sort vectors are by definition self-referential, the merging of such data structures presents efficiency issues. To follow the self-referential pointers in large sort vector data structures may result in slow performance for database systems which rely on sort vector structures in the indexes. This is particularly true for large indexes.

It is therefore desirable to have a computer system which permits sort vector data structures to be merged efficiently. In particular, a method which avoids the need to follow the self-referential pointers in both the sort vectors to be is merged is desirable.

SUMMARY OF THE INVENTION

According to one aspect of the present invention, there is provided a system for the merger of two sort vector data structures.

According to a further aspect of the present invention, there is provided a method for merging a first sort vector and a second sort vector, the respective sort vectors each being represented by an appropriate data structure, each sort vector comprising a set of runs of contiguous entries comprising self-referencing pointers defining sequences of data, the method comprising the steps of a) creating a location data structure comprising, for each entry in the first sort vector, a low limit pointer and high limit pointer pair, b) for each entry in the first sort vector, when there is a run in the second sort vector corresponding to the entry in the first sort vector, initializing the location data structure by defining the low limit pointer and the high limit pointer to point to the entire range of the first run in the second sort vector corresponding to the entry in the first sort vector, and where there is no run in the second sort vector corresponding to the entry in the first sort vector setting the low limit pointer and the high limit pointer to values representing a no match condition, c) making successive refinement passes through the first sort vector and the second sort vector until each low limit pointer and high limit pointer pair has converged, each refinement pass comprising the steps of i) selecting successive entries in the first sort vector, ii) for the selected entry in the first sort vector, following the entry's self-referential pointer to a following first sort vector entry, iii) defining as target values the location data structure low limit pointer and high limit pointer for the location data structure entry corresponding to the following first sort vector entry, iv) defining as current second sort vector entry values the location data structure low limit pointer and high limit pointer corresponding to the selected first sort vector entry, v) in the range in the second sort vector defined by the current second sort vector entry values, locating the insertion points of the target values, vi) replacing the target values in the location data structure entry corresponding to the following first sort vector entry with the insertion points of the target values, and d) using the corresponding converged low limit and high limit pointer pair to determine an insertion point into the second sort vector for each entry in the first sort vector and to thereby merge the first sort vector ad the second sort vector into a merged sort vector.

According to a further aspect of the present invention, there is provided the above method further comprising a join bit merger for merger of a first join bit vector and a second join bit vector into a merged join bit vector, the first, second and merged join bit vectors corresponding to the first, second and merged sort vectors, respectively, the join bit merger comprising the steps of a) initializing and equivalence flag for each entry in the first sort vector, b) propagating the equivalence flags in the successive refinement passes of the method of claim 1 such that the equivalence flag for an entry in the first sort vector is set where the token sequence for the entry in the first sort vector is matched in the second sort vector, and c) using the respective equivalence flags to determine the merged joint bit vector for the merged sort vector.

According to a further aspect of the present invention, there is provided the above method in which a first word list string data structure and a second word list string data structure are maintained for the tokens in the first sort vector and the second sort vector, respectively, the method further comprising a) merging the first word list string data structure and the second word list string data structure to form a merged word list string data structure, b) generating a first mapping data structure and a second mapping data structure, for recording the insertion points of entries in the first word list string data structure and of entries in the second word list string data structure, in the merged word list string data structure, respectively c) generating a first inverse mapping data structure and a second inverse mapping data structure to record the inverse of the first mapping data structure and the second mapping data structure, respectively, d) using the first and second mapping data structures, and the first and second inverse mapping data structures, to initialize the low limit pointer and the high limit pointer.

According to a further aspect of the present invention, there is provided the above method in which the values representing a no match condition are set to negative value pointers indicating the insertion point for the previous run in the second sort vector.

According to a further aspect of the present invention, there is provided a method for merging a first data index and a second data index, to generate a merged data index, the first and second data indexes each comprising location data structures comprising a key string data structure, a word list string data structure, a word list data structure, and an inverted file data structure, the first and second data indexes further comprising lexicographic data structures comprising a sort vector data structure, a join bit data structure, a lexicographic permutation data structure, and an inverse lexicographic permutation data structure, the method comprising the steps of a) merging the First and second key string data structure to form a merged key string data structure, b) merging the first and second word list string data structures to form a merged word list string data structure, c) merging the first and second inverted file data structures to form a merged inverted file data structure, d) finding the lexicographic insertion points for the lexicographic data structures, e) merging the first and second inverse lexicographic permutation data structures to form a merged inverse lexicographic permutation data structure, f) merging the first and second inverse lexicographic permutation data structures for form a merged inverse lexicographic permutation data structure, g) merging the first and second sort vector data structure to form a merged sort vector data structure, and h) merging the first and second join bit data structures to form a merged join bit data structure.

According to a further aspect of the present invention, there is provided the above method in which the method of finding the lexicographic inversion points for the lexicographic data structures and the means for merging the first and second sort vectors, comprise the method for merging a first sort vector and a second sort vector set out above.

According to a further aspect of the present invention, there is provided the above method further comprising a) generating a first mapping data structure and a second mapping data structure for recording the insertion points of entries in the first word list string data structure and of entries in the second word list string data structure, in the merged word list string data structure, respectively b) generating a first inverse mapping data structure and a second inverse mapping data structure to record the inverse of the first mapping data structure and the second mapping data structure, respectively, c) using the first and second mapping data structures, and the first and second inverse mapping data structures, to determine the merged inverted file data structure.

According to a further aspect of the present invention, there is provided a computer program product tangibly embodying a program of instructions executable by a computer to perform the above method steps.

According to a further aspect of the present invention, there is provided a computer program product for use with a computer comprising a central processing unit and random access memory, said computer program producing a computer usable medium having computer readable code means embodied in said medium for maintaining indexes for relational querying, said computer program product comprising:

a) computer readable program code for causing a computer to merge a first sort vector and a second sort vector, the respective sort vectors each being represented by an appropriate data structure, each sort of vector comprising a set of runs of contiguous entries comprising self-referencing pointers defining sequences of data, b) computer readable program code for causing a computer to create a location data structure comprising, for each entry in the first sort vector, a low limit pointer and high limit pointer pair, c) computer readable program code for causing a computer to, for each entry in the first sort vector, where there is a run in the second sort vector corresponding to the entry in the first sort vector, initialize the location data structure by defining the low limit pointer and the high limit pointer to point to the entire range of the run in the second sort vector corresponding to the entry in the first sort vector, and where there is no run in the second sort vector corresponding to the entry in hte first set vector, set the low limit pointer and the high limit pointer to values representing a no match condition, d) computer readable program code for causing a computer to make successive refinement passes through the first sort vector and the second sort vector until each low limit pointer and high limit pointer pair has converged, each refinement pass comprising the steps of i) selecting successive entries in the first sort vector, ii) for the selected entry in the first sort vector, following the entry's self-referential pointer to a following first sort vector entry, iii) defining as target values the location data structure low limit pointer and high limit pointer for the location data structure entry corresponding to the following first sort vector entry, iv) defining as current second sort vector entry values the location data structure low limit pointer and high limit pointer corresponding to the selected first sort vector entry, v) in the range in the second sort vector defined by the current second sort vector entry values, locating the insertion points of the target values, vi) replacing the target values in the location data structure entry corresponding to the following first sort vector entry with the insertion points of the target values, and e) computer readable program code for causing a computer to use the corresponding converse low limit and high limit pointer pair to determine an insertion point into the second sort vector for each entry in the first sort vector and to thereby merge the first sort vector and the sort vector into a merged sort vector.

Advantages of the present invention include the merger of sort vector structures with limited use of sort vector self-referential pointers. Further advantages of the invention include the maintenance of large indexes by sequential processing to avoid random access to potentially large index structures Further advantages of the invention include merging data structures which exceed the capacity of the main memory of a computer system in a manner which limits accessing the structures on disk (or similar media) and which provides a sequential access pattern to the structures.

BRIEF DESCRIPTION OF THE DRAWINGS

The preferred embodiment of the invention is shown in the drawings, wherein.

Figure 1:
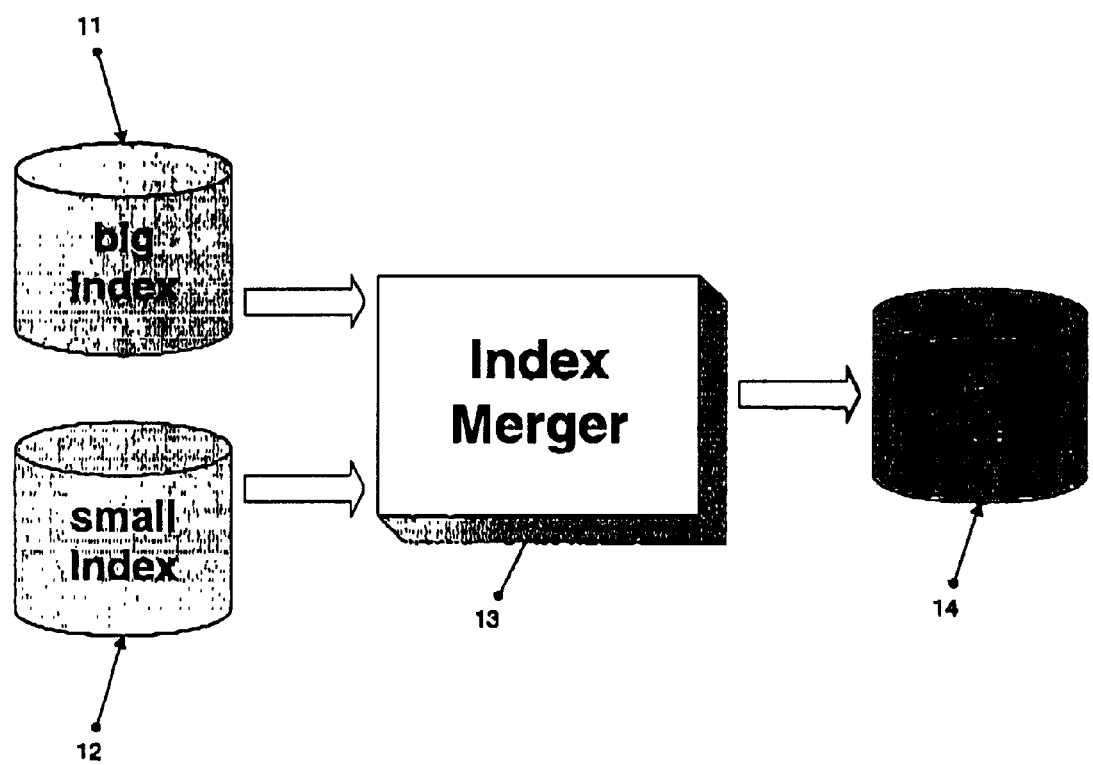
FIG. 1 is a block diagram illustrating the architecture of the index merger of the preferred embodiment of the invention.

In the drawings, the preferred embodiment of the invention is illustrated by way of example. It is to be expressly Understood that the description and drawings are only for the purpose of illustration and as an aid to understanding, and are not intended as a definition of the limits of the invention.

DETAILED DESCRIPTION OF THE PREFERRED EMBODIMENT

FIG. 1 is a block diagram representing the architecture of an index merger of the preferred embodiment of the invention.

The general architecture of such a merge is shown in FIG. 1 which includes two data indexes 11, 12. In the example of FIG. 1, index 11 is for existing data in a database, while index 12 is for new data intended to be added to the database. In FIG. 1, index 11 is shown as a big index and index 12 is shown as a small index.

It will also be apparent to those skilled in the art that the architecture of FIG. 1 applies to constructing new indexes for a single database rather than for adding new data to an existing database. Where new indexes are constructed single database it is advantageous to construct indexes on different tables in the table space and then merge the indexes to create a single large index for the database. In such a case index 11 and index 12 represent temporary indexes created in the process of generating a comprehensive index 14. As will be, apparent the process of merging index 11 and index 12 to create index 14 may be iterated with different sub-indexes in the process of building a large final index for a database, depending on the amount of data in the database to be indexed.

In the convention of the preferred embodiment those data structures relating to index 11 (the big index) are given a prefix "b", those relating to index 12 (the small index) are given the prefix "s".

FIG. 1 shows the step of index merger 13 and resulting now index 14 as the output of index merger 13 on index 11 and index 12. Those data structures relating to new index 14 are referred to with names including the prefix "n".

In the system of the preferred embodiment indexes 11, 12, 14 in FIG. 1 contain a number of different data structures, including sort vector data structures, which collectively make up the respective indexes.

The system of the preferred embodiment is illustrated with reference to example index structures as described in more detail below. In particular, the system of the preferred embodiment merges indexes which are defined in entitled "Indexing Databases For Efficient Relational Querying", naming Mariano Consens as inventor, and Joint Technology Corporation as assignee. It will be understood by those skilled in the art, however, that the method for merging sort vector data structures, and related data structures, as described in the preferred embodiment may have application in other systems which differ from the preferred embodiment system.

The preferred embodiment data and indexes are described with reference to example data as shown in FIGS. 2, 3, 4, 5. The indexes that are to merged (indexes 11, 12 in FIG. 1) can be created on any data presented through a tuple interface (an interface presenting a relational view of data). An index relating to one relational key for each table in each of the data sources can be used to efficiently request individual tuples from the underlying data sources. In the preferred embodiment, an index generator converts tables from a relational database (the source data to be indexed) into a token stream by requesting all the tuples of the tables.

An example first index on a data source containing one table (Table R) with one column (Column A) is set out below in Example 1.

TABLE R

| EXAMPLE 1 |
| --- |
| A |
| jmnb |
| jmne |
| jmcf |
| jmre |
| jmcb |

As part of the token stream created from the data source, each value (or attribute) in the table is prefixed by a special attribute token identifying the attribute's table and column (in the example, ER.A for table R and column A). The values from the table are also broken up into tokens, in the preferred embodiment on spaces between words (the values in the table are represented by individual letters in Example 1).

The index structure of the preferred embodiment includes several different and interrelated data structures that are created by the index generator. The data constructs of the preferred embodiment may be loosely grouped in two. First those data structures which relate to the position of the taken data in the data source file (which provide information about where in the data source topics are found), and second those data structures which provide information concerning the attribute-based lexicographic ordering of the tokens (which permit efficient comparisons of the source data). Included in the data structures provided are those that themselves carry out a mapping between position related data structure and the data structures that relate to lexicographically sorted tokens. This permits operations on the index to efficiently locate tuples in the source data that the index identifies as matching a query constraint or subject to a join operation. The data structures of an index in the preferred embodiment are set out below.

The data structures which relate to the position of the data in Example 1 are described with reference to FIG. 2, in which token stream 23 is generated as described above for the data in Example 1. Those skilled in the art will appreciate that the description of the data structures will be applicable for the entire token stream 23, or for an appropriately defined subset. The merge example set out below uses Table R of Example 1 as the basis for the big index (index 11 in FIG. 1).

Figure 2:
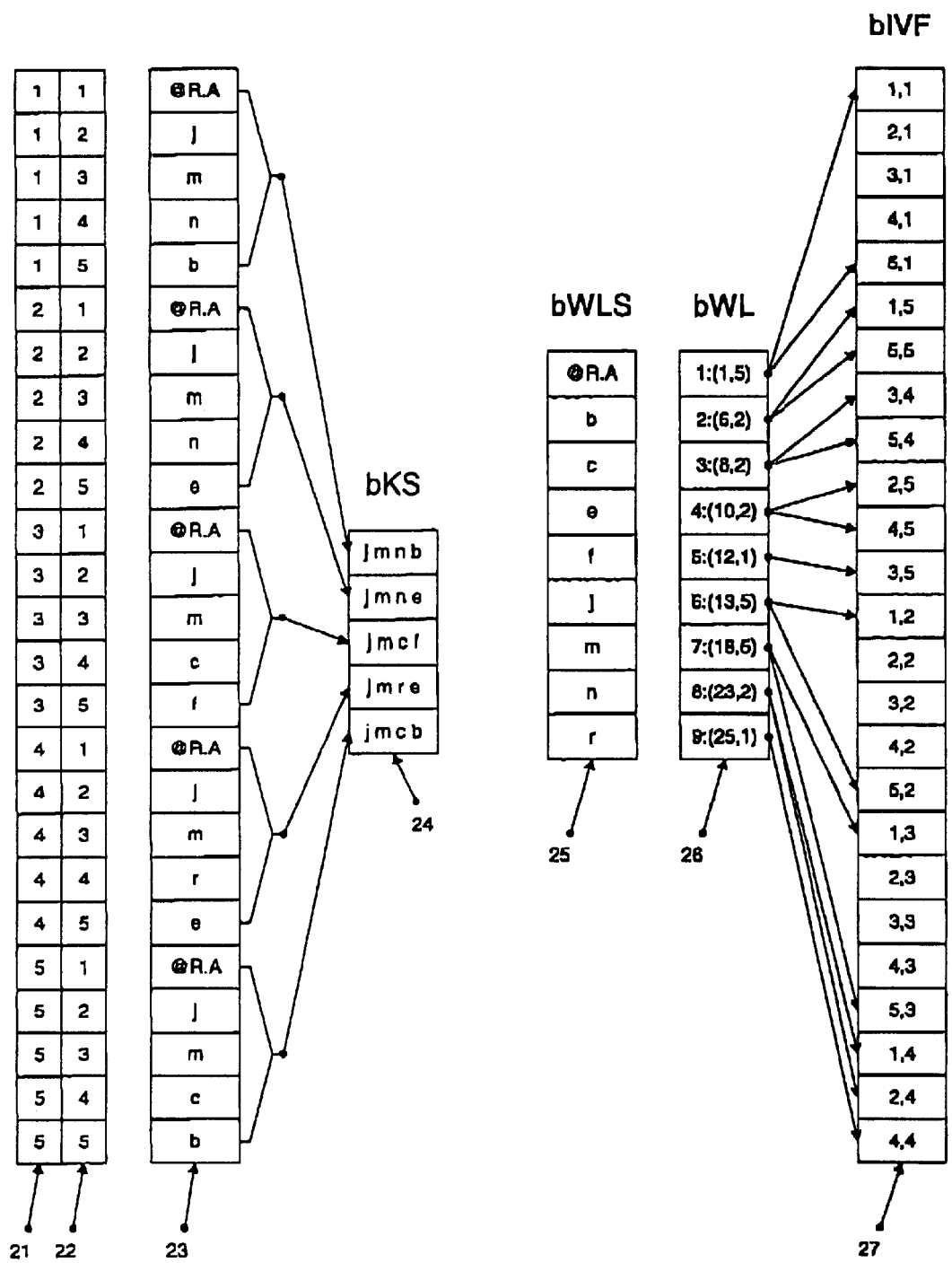
FIG. 2 is a schematic representation of the data structures for position-ordering of example data in the big database in the preferred embodiment.

FIG. 2 also includes bKS file 24 (keys file) which represents the set of attributes from Table R which are included in token stream 23. In the example used to illustrate the preferred embodiment, column A of Table R is a key attribute. Also shown in FIG. 2 are bWLS file 25 (sorted word list), bWL file 26 (a word list file), and bIVF file 27 (an inverted file). Although in the description of the preferred embodiment reference is made to files, it will be apparent to those skilled in the art that any appropriate data structure may be used to represent the data and the data structures making up the indexes on the data.

The bWLS file 25 is a sorted list of all unique tokens in token stream 23. The bWLS structure is used most often in conjunction with bWL file 26 to point to the runs within other structures that contain information for the corresponding token. A run is a contiguous series of entries in the data structure which relate to identical token values. Due to the lexicographic ordering of tokens which is the basis for the self-referential sort vector data structure, efficiencies in processing the data structures are achieved with the identification and management of runs in the dam as is set out below.

Each bWL entry (denoted bWL[br]) contains an initial offset within the structures pointed to (denoted bWL[br].initial). The run identifier pointer "br" is a reference to the distinct runs in the data structures pointed to by bWL file 26. Each entry in bWL file 26 also has a count of the number of entries within the run (denoted bWL[br].count for the run br).

The bIVF file 27 indirectly maps the position of unique tokens into their original data source. bIVF file 27 contains as many entries as the total number of tokens in the input stream. Each entry contains a link to a table within the data source. The information that is stored includes the topic id, and the offset of the token within the tuple (for ease of reference, these values are shown in FIG. 2 in columns 21 and 22, respectively). The tuple id points to the value of the keys that can be found in the bKS file 24 (and hence the keys values can be used to request the tuple from the data source). In the example in the figure, column A is the key for relation R. The runs corresponding to each token in the bIVF file 27 are sorted alphabetically by token, and within each run the entries are sorted in position order.

The bWL file 26 is used to map a token from bWLS file 25 into bIVF file 27, as well as other data structures (bSV, bJB, bLP and bILP, described later). The bIVF and the related structures have as many entries as the total number of tokens in the input stream and they also have the same number of runs corresponding to the same unique tokens. The bWL file 26 contains one entry for each unique token in the stream (same number of entries as bWLS file 25). Each entry contains an offset into bIVF file 27 and a run length. The offset indicates where the token run starts in bIVF file 27, and the length represents the number of entries in bIVF file 27 for that token. Each run is represented in the entries of bWL file 26 as a run id followed by a colon, while the start offset and length of each run in the bIVF file 27 (as well as the related structures mentioned above) is shown in parenthesis.

For example, in FIG. 2, there is a run of entries for the unique token "e" in bIVF. The bWL entry for run br=4 which corresponds to token "e" is (10, 2), indicating that the run in bIVF begins at position 10 and is 2 entries long. The values in those two entries in bIVF file 27 are (2,5) and (4,5) respectively, which correspond to the locations in token stream 13 where the token "e" is found.

Figure 3:
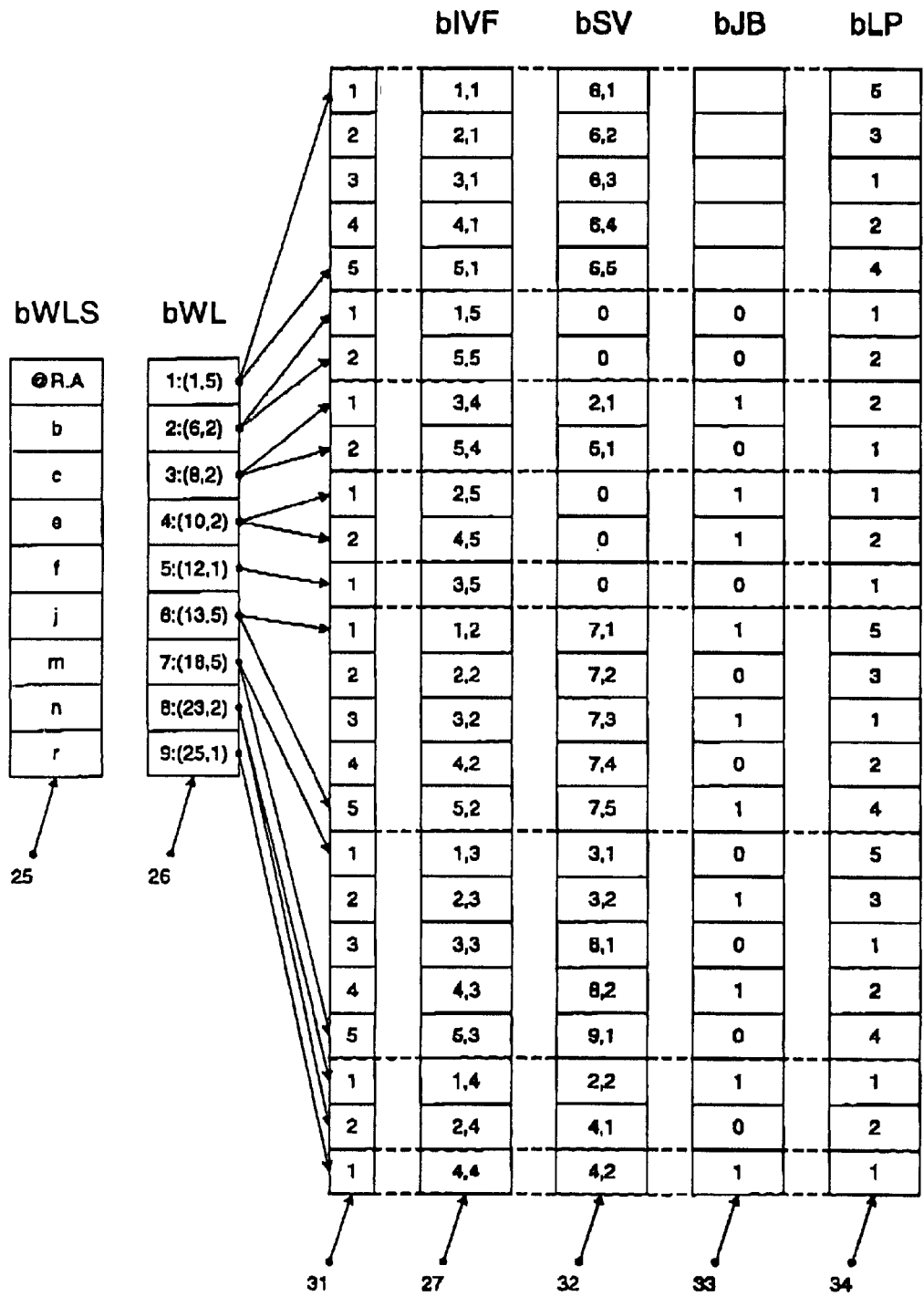
FIG. 3 is a schematic representation of the data structures for lexicographic-ordering of the example data in the big database in the preferred embodiment.

FIG. 3 represents the data structures that relate to the lexicographic sort of the data. FIG. 3 shows bSV file 32 (sort vector), bJB file 33 (join bit), and bLP file 34 (lexicographic permutation).

As is the case with soft vector data structures in general, each entry in bSV file 32 is an indirect pointer into bSV file 32, itself. The entries in the sort vector of the preferred embodiment are indirect in the sense that they are represented as run identifiers (run ids) and offsets and are therefore read with reference to bWL file 26. An entry in bSV file 32 points (by way of bWL file 26) to the position in the bSV file 32 for the token that follows that entry in the token stream. To accomplish this indirect self-referential pointer structure, the information that is stored in each entry of bSV 32 includes the run id (from bWL file 26), and the offset of the entry within the run (for ease of reference this offset is shown in column 31 in FIG. 3).

As is indicated above, the sort vector structure of the preferred embodiment stores tokens in lexicographic order based on attributes (an attribute comprising a chain of tokens in the sort vector structure). Each attribute chain of tokens is ended (on reaching the last token of the attribute) by an index to the zero entry, which is reserved for this purpose. By following the chain of entries in bSV file 32, each attribute value can be reconstructed. The entries within each run of the bSV file 32 are sorted lexicographically according to the remaining tokens in the chain to the end of the attribute (and by position of the tokens in the token stream in case of tie).

FIG. 3 also shows bJB file 33 which is related to the bSV file 32 and may be used to perform SQL table joins. Two adjacent entries (which can be implemented by a single bit) in bJB table 33 have the same value (i.e., either both 0 or both 1) if and only if the two entries have corresponding bSV chains of following tokens which are identical to the end of each of the attributes.

There are two other data structures which are found in the indexes to be merged by the preferred embodiment and which map between bSV file 32 and bIVF file 27. As shown in FIG. 3, bLP file 34 main bSV file 32 into bIVF file 27, Given an entry in bSV file 32, bLP file 34 maps the token into the corresponding token (in the same run) in bIVF file 27, which then indicates the exact position of the word in the data source. The second of these data structures is the bILP file (inverse lexicographic permutation), not shown in the figures. The bILP structure maps bIVF file 27 into bSV file 32 and is therefore the inverse of bLP file 34. Given an entry in bIVF file 27, the bILP maps the token into the corresponding token (in the same run) in bSV file 32. As the bILP is merely the inverse of bLP file 34, it is not described in detail. The description of bLP file 34 applying to the bILP file, with the appropriate modifications to reflect the inverse relationship between the two data structures.

To illustrate an example merge for the system of the preferred embodiment, an example second index on a data source containing one table (Table S) with one column (Column B) is set out below in Example 2.

TABLE S

EXAMPLE 2

B
jmq
jmcf

Figure 4:
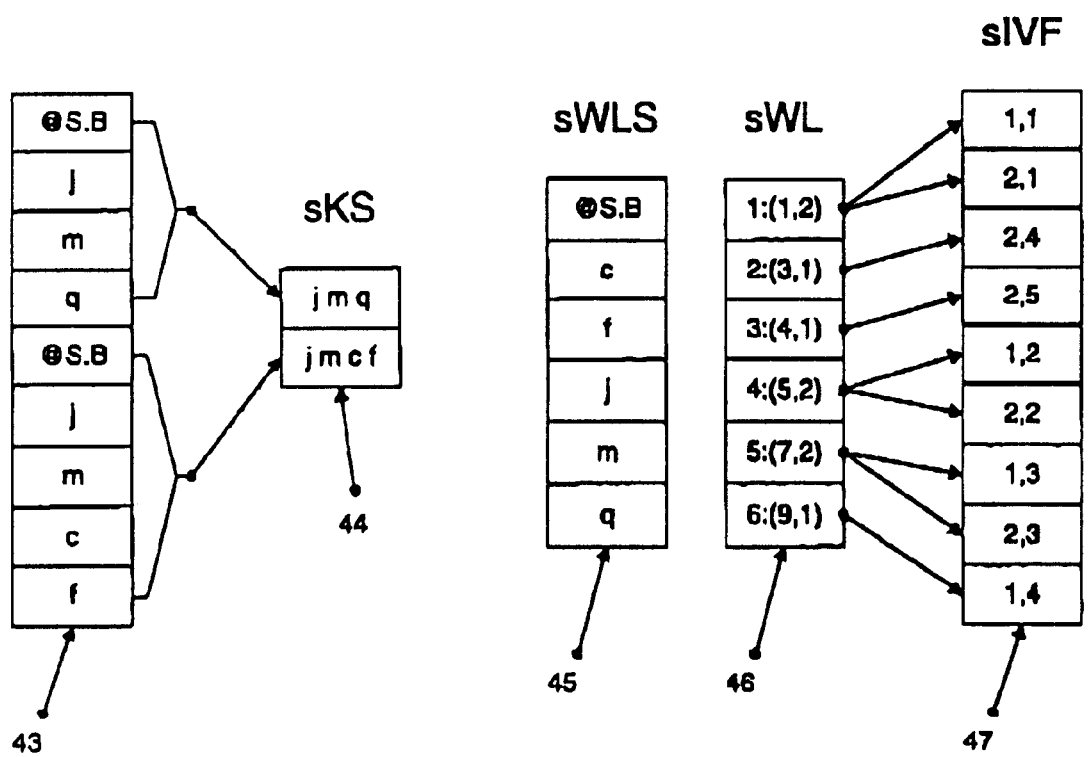
FIG. 4 is a schematic representation of the data structures for position-ordering of example data in the small database in the preferred embodiment.
Figure 5:
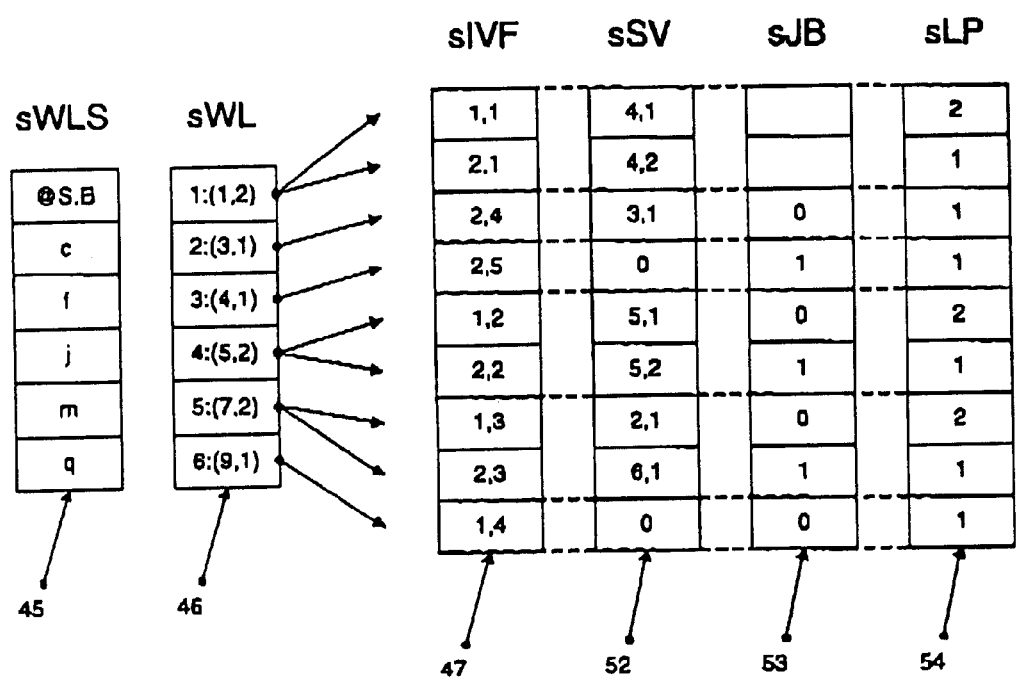
FIG. 5 is a schematic representation of the data structure for lexicographic-ordering of the example data in the small database in the preferred embodiment.

FIGS. 4 and 5 represent the data structures that relate to the position and to the lexicographic sort of the data in Example 2, respectively. The description for the data structures are analogous to the ones provided for the data in Example 1. In FIG. 4, data structures token stream 43, sKS file 441 sWLS file 45, sWL file 46 and sIVF file 47 are shown. As may be seen in FIG. 4, the data of Example 2 is indexed with respect to location by the data structures set out in the figure in a manner similar to that shown in FIG. 2 for the data of Example 1.

Similarly, FIG. 5 shows data structures sSV file 52, sJB file 53 and sLP file 54 which correspond to bSV file 32, bJB file 33 and bLP file 34 as shown in FIG. 3.

The preferred embodiment of the invention constructs a new index given structures described in reference to FIGS. 2, 3, 4, 5. The merge that is carried out by the preferred embodiment consists of eight steps which are described below and which are referred to by the following names: MergeKS, MergeWLS, MergeIVF, FindLexInsertions, MergeLP, MergeILP, MergeSV, and MergeJB.

As will be apparent, merging the two sort vector structures bSV file 32 and sSV file 52 is a step which may be accomplished without other steps set out below, For example, the Merge JB step is relevant for the index data structures described in the preferred embodiment but is not otherwise a part of merging two sort vector data structures.

The first step (not shown), MergeKS, produces a new KS file by simply appending sKS file 44 to bKS file 24. From this point on all tuple ids coming from the small index are adjusted to start at the end of the first index tuple id range (i.e., tuples 1 and 2 in the second index token stream become tuples 6 and 7).

For the second step, MergeWLS, a pass is made merging bWLS file 25 and sWLS file 45. This pass determines the insertion points of the words of bWLS and sWLS in the resulting nWLS file 61, shown in FIG. 6. As indicated above, each word in bWLS file 25 corresponds to a run (of contiguous entries) in the other files, such as bSV file 32. Once bWLS file 25 and sWLS file 45 are merged and information about the relative values of the entries in the two files is recorded, as described below, the contents of the two files and its corresponding merged nWLS file 61 are no longer needed to complete the merger of the two indexes as described in the preferred embodiment.

Figure 6:
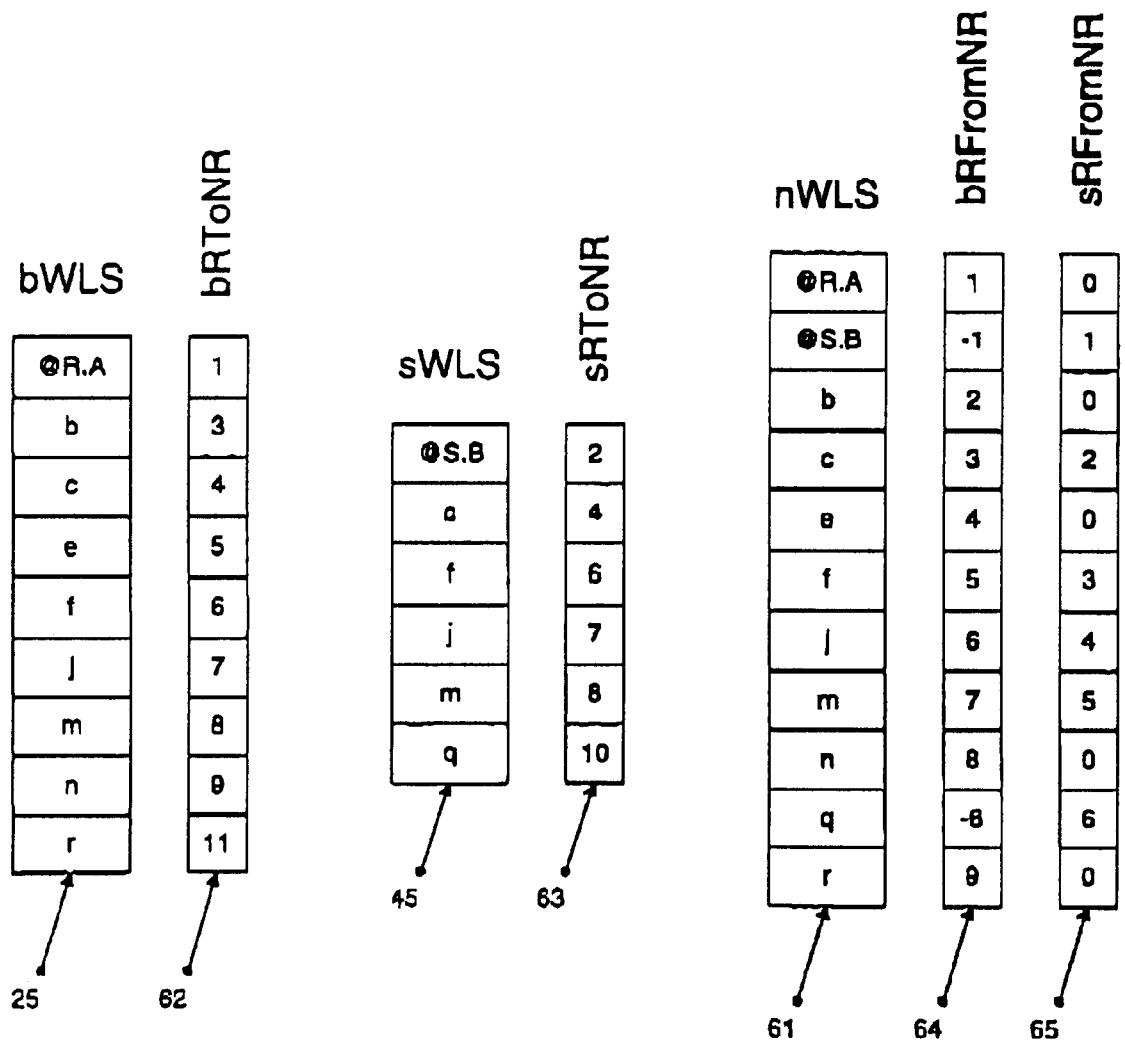
FIG. 6 is a schematic representation of the mapping data structures at the end of the MergeWLS step, for the example data shown in the description of the preferred embodiment.

As is shown in FIG. 6, as part of the MergeWLS step, the insertion points of the runs of bWLS file 25 and sWLS file 45 are recorded in structures bRToNR 62 and sRToNR 63, as well as the reverse mappings from new runs to big and small runs (bRFromNR 64 and sRFromNR 65, respectively). Note that a negative number is used in bRFromNR as a convenient encoding of the preceding big run number for the entry corresponding to a small run. Although the contents of the bWLS file 25, sWLS file 45 and nWLS file 61 are words, the words are represented by runs of entries in other data structures and for this reason the insertion points and the reverse mappings stored in structures bRToNR 62, sRToNR 63, bRFromNR 64 and sRFromNR 65 refer to runs.

Figure 7:
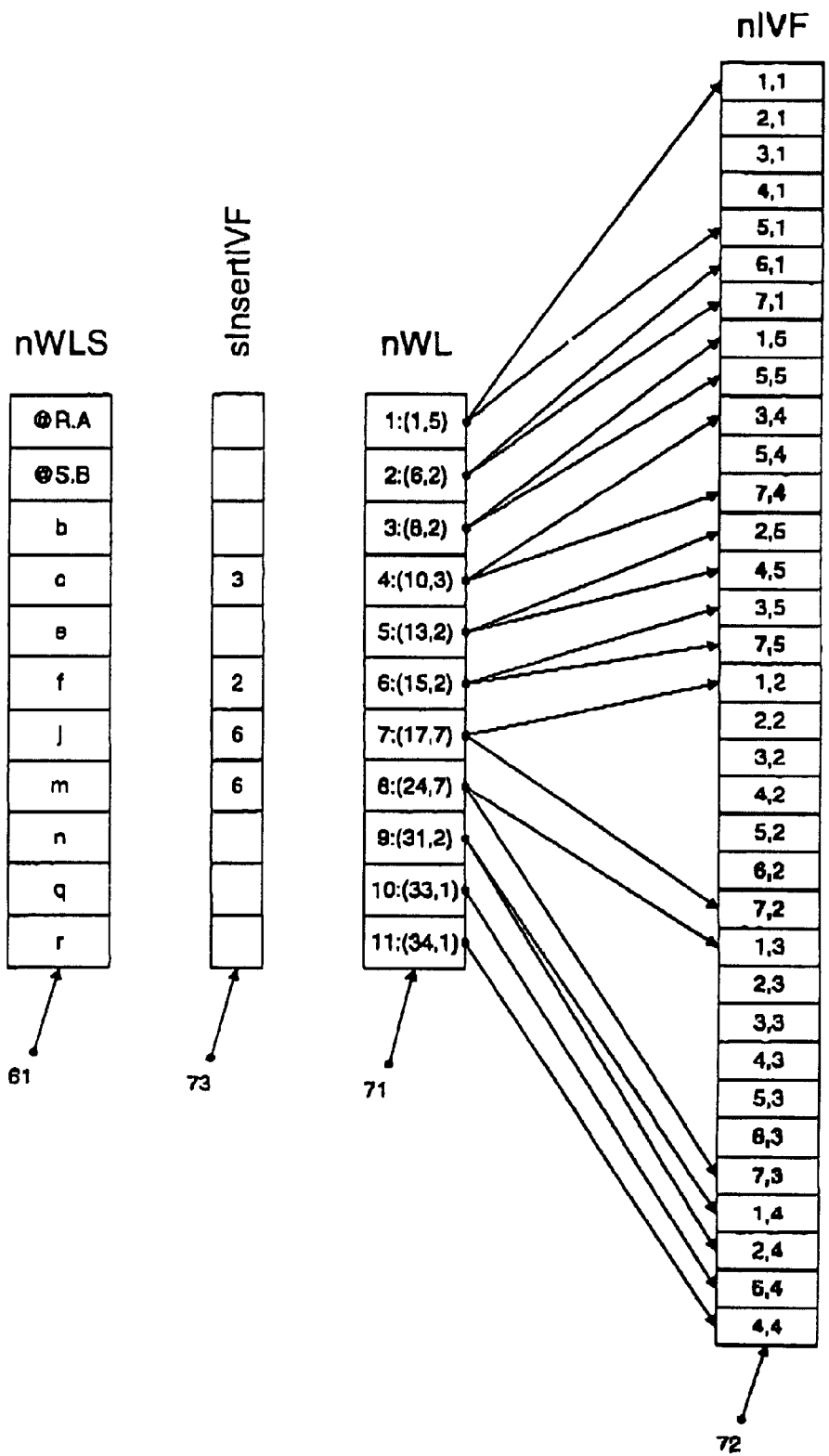
FIG. 7 is a schematic representation of the data system at an end of the MergeIVF step on the example data shown in the description of the preferred embodiment.

In the third step, MergeIVF, a new nIVF file 72 of FIG. 7 is produced on a run by run basis, with the associated nWL file 71. For each new run in nIVF file 72, entries are copied from the runs of bIVF file 27 and runs of sIVFfile 47 (with tuple ids adjusted as per MergeKS, and shown in FIG. 7 in bold font). The copying of such runs is determined according to bRFromNR 64 and sRFromNR 65, respectively. When entries from both bIVF file 27 and sIVF file 47 must be copied, the sIVF file 47 entries are appended to the bIVF file 27 entries, and the offset within each run where the entries from sIVF file 47 start to be appended is recorded in ssInsertIVF 73. The appended entries from sIVF file 4 are represented by bold text entries within nIVF file 72 in FIG. 7.

The fourth step, FindLexInsertions, is conceptually similar to the MergeWLS step, in that the objective is to merge two sorted lists, in this case bSV file 32 and sSV file 52. This merge operation requires a comparison of the lexicographic ordering of the tokens in each of the two files. However, in order to directly compare entries in the two sort vector structures, it is necessary to follow the attribute chains until the end of each attribute is reached. Following these chains within bSV file 32 results in a random access pattern on the file. Such an access pattern is likely to produce system performance which is orders of magnitudes worse than sequential accesses on the same file.

To avoid random access to bSV file 32, the system of the preferred embodiment sequentially processes each run in bSV file 32. For each entry in sSV file 52, each run in bSV file 32 is processed sequentially to successively refine ranges (defined by the two pointers bLow and bHigh) within runs in bSV file 32. The bLow and bHigh pointers define a range in a run that includes the insertion point for a given entry in sSV file 52. Successive passes will refine the range defined for each of the sSV file 52 entries, until the values of bLow and bHigh converge to the insertion point for the entry from sSV file 52 within bSV file 32.

The above iterative process is described in the pseudocode set out below and with reference to FIGS, 8, 9, 10. The system of the preferred embodiment also includes an indicator E. This indicator records whenever an end of attribute pointer in sSV file 52 or bSV file 32 is reached. The indicator B is utilized by the system to merge bJB file 33 and sJB file 53 in the MergeJB step carried out by the system of the preferred embodiment.

The pseudocode for the FindLexInsertions step is as follows:

```
pass := 0;
allDone := true;
for each sr in sWL
    br :=[0 bRFromNR[sRToNR[sr]];
    for each si in the range
    (sWL[sr].initial, sWL[sr].initial+sWL[sr].count-1)
        if (br<0) then
            bLow[si] := (-br, bWL[-br].count+1);
            bHigh[si] := (-br, bWL[-br].count+1);
        else if (sSV[si] = 0) then
            bLow[si] := (br, bWL[br].count);
            bHigh[si] := (br, bWL[br].count);
            E[si] := true;
        else
            bLow[si] := (br, 0);
            bHigh[si] := (br, bWL[br].count);
            allDone := false;
        end if
    end for
end for
while (not allDone)
    pass := pass + 1;
    allDone := true;
    for each sr in sWL
        br := bRFromNR[sRToNR[sr]];
        for each si in the range
        (sWL[sr].initial, sWL[sr].initial+sWL[sr].count-1)
            if (bLow[si] < bHigh[si]) then
                bLow[si] := find bLow[sSV[si]]in
    (bSV[bWL[br].initial], bSV[bWL[br].initial+bWL[br].count-1]);
                bHigh[si] := find bHigh[sSV[si]]in
    (bSV[bWL[br].initial], bSV[bWL[br].initial+bWL[br].count-1]);
                if (bLow[si] = bHigh[si]) then
                    E[si] := E[sSV[si]];
                else
                    allDone := false;
                end if
            end if
        end for
    end for
end while
```

Figure 8:
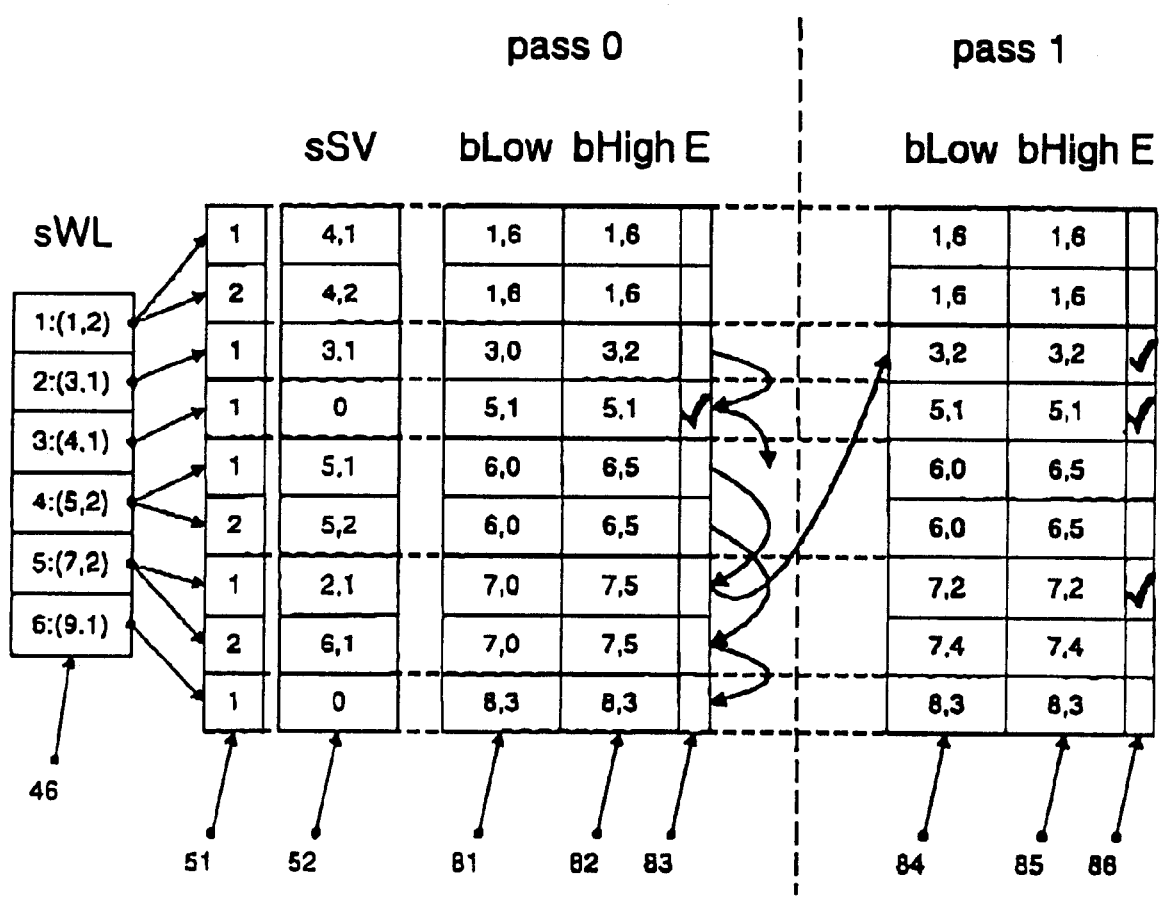
FIGS. 8 and 9 are schematic representations of data structures of the preferred embodiment at the end of each of the passes of the FindLexInsertions step, for the example data of the description of the preferred embodiment.
Figure 9:
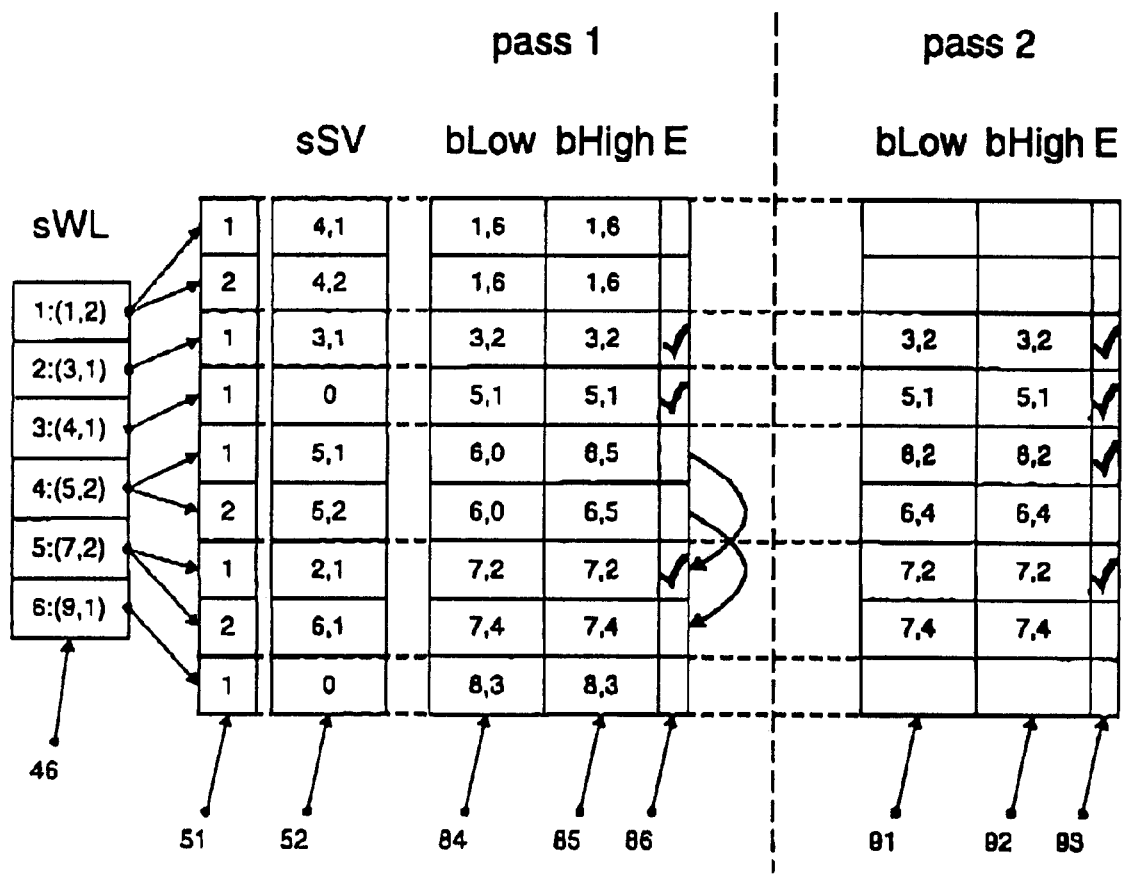

The pseudocode set out above may be traced with reference to FIGS. 8 and 9. FIGS. 8 and 9 show the different sequential passes through the data structures of the indexes for the data of Example 1 and Example 2. The different values for the two pointers bLow and bHigh arc shown converging on the insertion points for the entries of sSV file 52 in bSV file 32.

The arrows in FIGS. 8 and 9 represent the self-referential values of sSV file 52 (as pointed to by reference to sWL file 46). The indicator B is shown in columns 83, 86, 93 and the indicator is set for insertion points where the sort vector token sequences are equivalent in sSV file 52 and bSV file 32.

Figure 10:
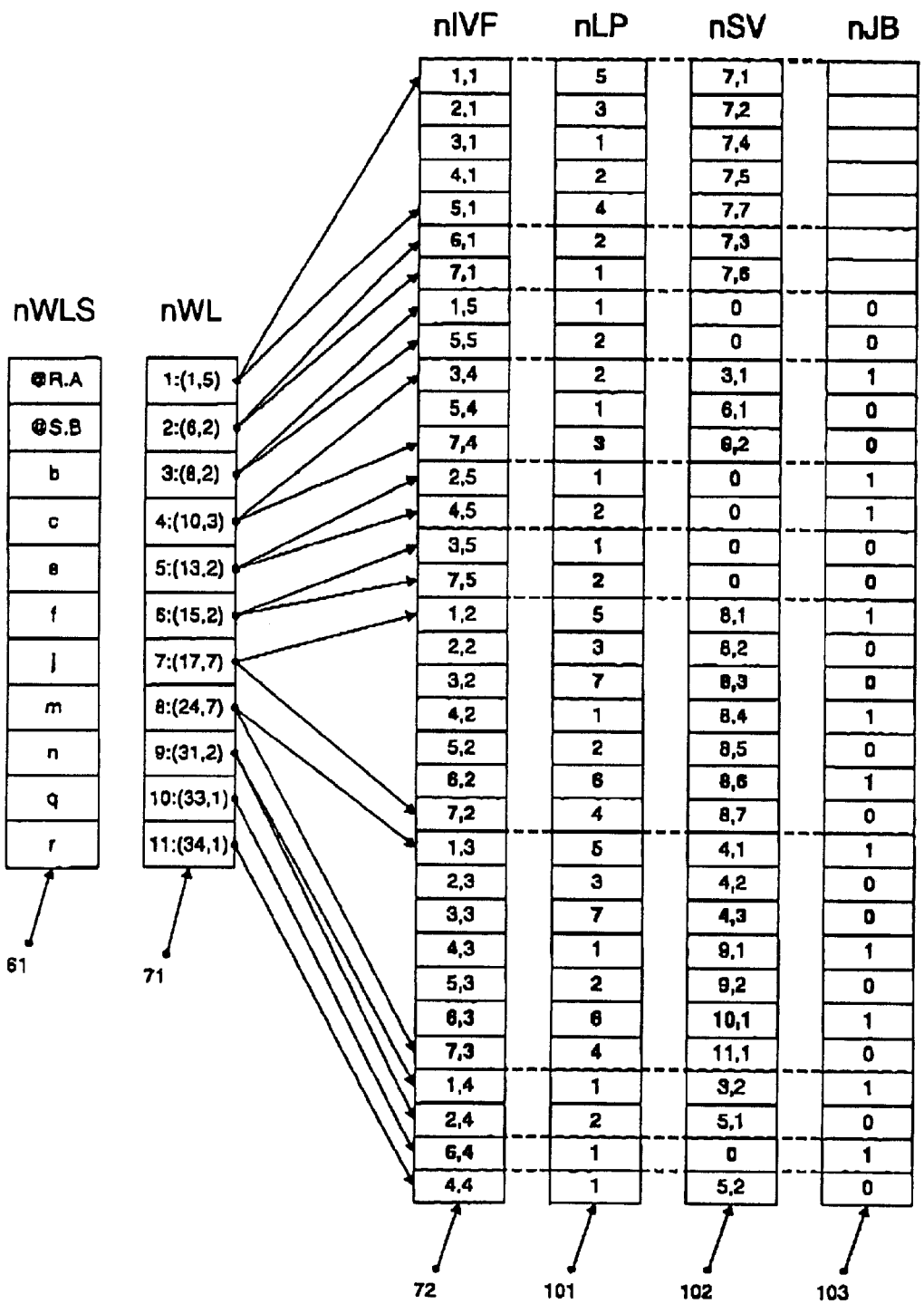
FIG. 10 is a schematic representation of data structures for the new merged Index at the end of the Index Merger process, for the example data of the description of the preferred embodiment.

In the fifth and sixth steps, MergeLP and MergeILP, a pass over bLP and sLP using the information collected in the previous step as well as the sInsertIVF data produces the nLP file 101 of FIG. 10 (a similar process produces nILP).

The steps followed in the preferred embodiment to accomplish the merging of the bLP file 34 and sLP file 54 are set out as follows. The MergeLP step involves the creation of a new nLP file 101 which contains the mappings between nSV file 102 (shown in FIG. 10) and nIVF file 72. The values for the entries in nLP file 101 are taken from either bLP file 34 or sLP file 54 according to whether a bSV or sSV entry is found in nSV file 102. The values for the entries in nSV file 102 corresponding to entries from bSV file 32 do not require adjustment. The values for the entries in nSV file 102 entries which come from sSV file 52 are adjusted to include an offset. The offset is calculated to reflect the fact that nIVF file 72 is comprised of bIVF file 27 entries with entries from sIVF file 47 appended at the appropriate locations. This offset is recorded in sInsertIVF file 73 (shown in FIG. 7).

The implementation details of the MergeLp process may vary according to specific design of the system, and the environment in which the system of the preferred embodiment runs, but the design of different implementation& d the MergeLP step will be within the purview of those skilled in the art.

A similar process to the MergeL2 step is implement to carry out the MergeILP step. The ILP structures correspond to a mapping which is the inverse of the mapping of the LP data structures. For this reason, the steps of the MergeILP step, which merges the sILP and bILP files to form a new nILP file for the merged index, will be implemented in the same manner as the MergeLP step, but with modifications to reflect the inverse relationship between the LP and ILP structures. The nILP structure is not shown in the Figures but its structure will apparent to those skilled in the art.

The seventh step referred to above is the MergeSV step which takes sSV file 52 and bSV file 32 and merges the two files to create nSV file 102 which is a merged file reflecting the sort vector structure for the merged indexes. The MergeSV step incorporates a pass carried out on a run by run basis over bSV file 32. The data in sSV file 52 and the data which has been accumulated in the FindLexInsertions step are used to produce nSV file 102 of FIG. 10. The self-referencing entries of nSV file 102 are adjusted by using appropriately computed mappings. A more detailed description of the MergeSV step, follows.

The nSV file 112 is created by the MergeSV step using the bSV file 32, sSV file 52 and bHigh, bLow values determined in the FindLexInsertions step. As indicated above, the bHigh and bLow values have converged and are identical following the FindLexInsertions step which step de the position in bSV file 32 that each entry in sSV file 52 is to be inserted.

As shown in FIG. 10, nSV file 102 is a self-referencing structure and for this reason the MergeSV step requires adjustment of the entries from bSV file 32 and sSV file 52 to ensure the resulting nSV structure is defined correctly. The MergeSV step can therefore be thought of as the insertion of sSV entries into bSV file 32, with the bHigh, bLow pointer (converged) determining where sSV entries are to be inserted into bSV file 32.

The ran pointer information in nSV file 102 is determined from sRFromNR 65 and bRfromNR 64 data which is determined as set out above. The data for the nSV file 102 entries which reflect the offset within each run in the nSV will be determined as set out below.

For nSV file 102 entries which come from bSV fee 32, the bSV run offset entry values will be adjusted to reflect the number of preceding sSV entries in the given run which are in nSV file 102.

Similarly, the nSV run offset values for nSV entries which come from sSV Me 52 will be defined by the number of preceding bSV entries and preceding nSV entries which are in the given run in nSV file 102. In fact, the rim offset values for the nSV entries from sSV file 52 will be determined by the bHigh, bLow converged pointer, as adjusted by the position of the given sSV entry in sSV file 52. In this manner, nSv file 102 is generated from the information determined in the FindLexInsertions step.

Finally, the last step, MergeJB, produces nJB file 103 of FIG. 10 by making a pass over bJB file 33 and sJB file 53 in conjunction with the information collected in FindLexInserdons (including end of attribute matching).

As shown in FIG. 10, nJB file 103 relates to the values of sequences for the entries in nSV file 102. The nJB values will be derived from the sJB, bSV and E values. Where contiguous nSV entries originate from bSV file 32, the nSV values will be taken directly from bJB file 33. Where a following nSV value comes from sSV file 52, the corresponding E value from column 103 will determine if there is a flip of the nJB value. In this manner, nJB file 103 may be generated in an efficient manner.

As the above indicates, the system and method of the preferred embodiment make possible the merging of complex index structures in a manner which reduces time-consuming disk access steps.

Although a preferred embodiment of the present invention has been described here in detail, it will be appreciated by those skilled in the art, that variations may be made thereto, without departing from the spirit of the invention or the scope of the appended claims.

We claim:

1. A method for merging a first sort vector and a second sort vector, the respective sort vectors each being represented by an appropriate data structure, each sort vector comprising a set of runs of contiguous entries comprising self-referencing pointers defining sequences of data, the method comprising the steps of
   a) creating a location data structure comprising, for each entry in the first sort vector, a low limit pointer and high limit pointer pair,
   b) for each entry in the first sort vector, where there is a run in the second sort vector corresponding to the entry in the first sort vector, initializing the location data structure by defining the low limit pointer and the high limit pointer to point to the entire range of the run in the second sort vector corresponding to the entry in the first sort vector, and where there is no run in the second sort vector corresponding to the entry in the first sort vector, setting the low limit pointer and the high limit pointer to values representing a no match condition,
   c) making successive refinement passes through the first sort vector and the second sort vector until each low limit pointer and high limit pointer pair has converged, each refinement pass comprising the steps of
      i) selecting successive entries in the first sort vector,
      ii) for the selected entry in the first sort vector, following the entry's self-referential pointer to a following first sort vector entry,
      iii) defining as target values the location data structure low limit pointer and high limit pointer for the location data structure entry corresponding to the following first sort vector entry,
      iv) defining as current second sort vector entry values the location data structure low limit pointer and high limit pointer corresponding to the selected first sort vector entry,
      v) in the range in the second sort vector defined by the current second sort vector entry values, locating the insertion points of the target values,
      vi) replacing the target values in the location data structure entry corresponding to the following first sort vector entry with the insertion points of the target values,
   d) using the corresponding converged low limit and high limit pointer pair to determine an insertion point into the second sort vector for each entry in the first sort vector and to thereby merge the first sort vector and the second sort vector into a merged sort vector.

2. The method of claim 1 further comprising a join bit merger for merger of a first join bit vector and a second join bit vector into a merged join bit vector, the first, second and merged join bit vectors corresponding to the first, second and merged sort vectors, respectively, the join bit merger comprising the steps of
   a) initializing and equivalence flag for each entry in the first sort vector,
   b) propagating the equivalence flags in the successive refinement passes of the method of claim 1 such that the equivalence flag for an entry in the first sort vector is set where the token sequence for the entry in the first sort vector is matched in the second sort vector, and
   c) using the respective equivalence flags to determine the merged joint bit vector for the merged sort vector.

3. The method of claim 1 in which a first word list string data structure and a second word list string data structure are maintained for the tokens in the first sort vector and the second sort vector, respectively, the method further comprising
   a) merging the first word list string data structure and the second word list string data structure to form a merged word list string data structure,
   b) generating a first mapping data structure and a second mapping data structure for recording the insertion points of entries in the first word list string data structure and of entries in the second word list string data structure, in the merged word list string data structure, respectively
   c) generating a first inverse mapping data structure and a second inverse mapping data structure to record the inverse of the first mapping data structure and the second mapping data structure, respectively
   d) using the first and second mapping data structures, and the first and second inverse mapping data structures, to initialize the low limit pointer and the high limit pointer.

4. The method of claim 1 in which the values representing a no match condition are set to negative value pointers indicating the insertion point for the previous run in the second sort vector.

5. A method for merging a first data index and a second data index, to generate a merged data index, the first and second data indexes each comprising location data structures comprising a key string data structure, a word list string data, a word list data structure, and an inverted file data structure, the first and second data indexes further comprising lexicographic data structures comprising a sort vector data structure, a join bit data structure, a lexicographic permutation data structure, and an inverse lexicographic permutation data structure, the method comprising the steps of
   a) merging the fast and second key string data structures to form a merged key string data structure,
   b) merging the first and second word list string data structure to form a merged word list string data structure,
   c) merging the first and second inverted file data structures to form a merged inverted file data structure,
   d) finding the lexicographic insertion points for the lexicographic data structures,
   e) merging the first and second lexicographic permutation data structures to form a merged lexicographic permutation data structure, f) merging the first and second inverse lexicographic permutation data structures to form a merged inverse lexicographic permutation data structure, g) merging the first and second sort vector data structures to form a merged sort vector data structure, and h) merging the first and second join bit data structures to form a merged join bit data structure.

6. The method of claim 5 in which the method of finding the lexicographic insertion points for the lexicographic data structures and the for merging the first and second sort vectors, comprise the method for merging a first sort vector and a second sort vector set out in claim 1.

7. The method of claim 5 further comprising a) generating a first mapping data structure and a second mapping data structure for recording the insertion points of entries in the first word list string data structure and of entries in the second word list string data structure, in the merged word list string data structure, respectively b) generating a first inverse mapping data structure and a second inverse mapping data structure to record the inverse of the first mapping data structure and the second mapping data structure, respectively, c) using the first and second mapping data structures, and the first and second inverse mapping data structures, to determine the mapped inverted file data structure.

8. A computer program product tangibly embodying a program of instructions executable by a computer to perform the method steps of claims 1, 2, 3, 4. 5, 6, or 7.

9. A computer program product for use with a computer comprising a central processing unit and random access memory, said computer program product comprising a computer usable medium having computer readable code means embodied in said medium for maintaining indexes for relational querying, said computer program product comprising:

a) computer readable program code for causing a computer to merge a first sort vector and a second sort vector, the respective sort vectors each being represented by an appropriate data structure, each sort vector comprising a set of runs of contiguous entries comprising self-referencing pointers defining sequences of data, b) computer readable program code for causing a computer to create a location data structure comprising, for each entry in the first sort vector, a low limit pointer and high limit pointer pair, c) computer readable program code for causing a computer to, for each entry in the first sort vector, here there is a run in the second sort vector corresponding to the entry in the first sort vector, initialize the location data structure by defining the low list pointer and the high limit pointer to point to the entire range of the run in the second sort vector corresponding to the entry in the first sort vector, and where there is no ran in the second sort vector corresponding to the entry in the first sort vector, set the low limit pointer and the high limit pointer to values representing a no match condition, d) computer readable programs code for causing a computer to make successive refinement passes through the first sort vector and the second sort vector until each low limit pointer and high limit pointer pair has converged, each refinement pass comprising the steps of i) selecting successive entries in the first sort vector, ii) for the selected entry in the first sort vector, following the entry's self-referential pointer to a following fir sort vector entry, iii) defining as target values the location data structure low limit pointer and high limit pointer for the location data structure entry corresponding to the following first sort vector entry, iv) defining as current second sort vector entry values the location data structure low limit pointer and high limit pointer corresponding to the selected first sort vector entry, v) in the range in the second sort vector defined by the current second sort vector entry values, locating the insertion points of the target values, vi) replacing the target values in the location data structure entry corresponding to the following first sort vector entry with the insertion points of the target values, e) computer readable program code for causing a computer to use the corresponding converged low and high limit pointer pair to determine an insertion point into the second sort vector for each entry in the first sort vector and to thereby merge the first sort vector and the second sort vector into a merged sort vector.

10. A computer program product for use with a computer comprising a central said computer program product processing unit and random access memory, said computer program product comprising a computer usable medium having computer readable code means embodied in said medium for maintaining indexes for relational querying, said indexes each comprising location data structures comprising a key string data structure, a word list string data structure, a word list data structure, and an inverted file, data structure, and each further comprising lexicographic data structures comprising a sort vector data structure, a join bit data structure, a lexicographic permutation data structure, and an inverse lexicographic permutation data structure, said computer program product comprising computer readable program code for causing a computer to merge a first data index ad a second data index, to generate a merged data index, said computer program product further comprising, a) computer readable program code for causing a computer to merge the first and second key string data structures to form a merged key string data structure, b) computer readable program code for causing a computer to merge the first and second word list string data structures to form a merged word list string data structure, c) computer readable program code for causing a computer to merge the first and second inverted file data structures to form a merged inverted file data structure, d) computer readable program code for causing a computer to find the lexicographic insertion points for the lexicographic data structures, e) computer readable program code for causing a computer to merge the first and second lexicographic permutation data structures to form a merged lexicographic permutation data structure, f) computer readable program code for causing a computer to merge the first and second inverse lexicographic permutation data structures to form a merged inverse lexicographic permutation data structure, g) computer readable program code for causing a computer to merge the first and second sort vector data structures to form a merged sort vector data structure, and h) computer readable program code for causing a computer to merge the first and second join bit data structures to form a merged join bit data structure.

* * * * *